United States Patent [19]

Yamamoto et al.

[11] 4,128,768

[45] * Dec. 5, 1978

[54] OZONE GENERATING APPARATUS

[75] Inventors: Yoshihiko Yamamoto; Masahiro Shigenobu; Hideo Kuwabara, all of Amagasaki, Japan

[73] Assignee: Mitsubishi Denki Kabushiki Kaisha, Tokyo, Japan

[*] Notice: The portion of the term of this patent subsequent to Sep. 27, 1994, has been disclaimed.

[21] Appl. No.: 817,097

[22] Filed: Jul. 19, 1977

Related U.S. Application Data

[63] Continuation of Ser. No. 577,455, May 14, 1975, Pat. No. 4,051,045.

[51] Int. Cl.² ............................................ C01B 13/11

[52] U.S. Cl. .................................. 250/535; 204/176; 250/536; 363/8; 363/74

[58] Field of Search ....................... 250/535, 536, 537; 204/176; 363/8, 74

Primary Examiner—Benjamin R. Padgett
Assistant Examiner—Deborah L. Kyle
Attorney, Agent, or Firm—Oblon, Fisher, Spivak, McClelland & Maier

[57] ABSTRACT

An ozone generating apparatus is disclosed which comprises a power source device for feeding a rectangular waveform alternating current between the discharge electrodes of a discharge tube of an ozone generator. One or both of the output current and frequency of the power source device is controlled to overcome the disadvantages of the conventional ozone generating apparatus.

1 Claim, 9 Drawing Figures

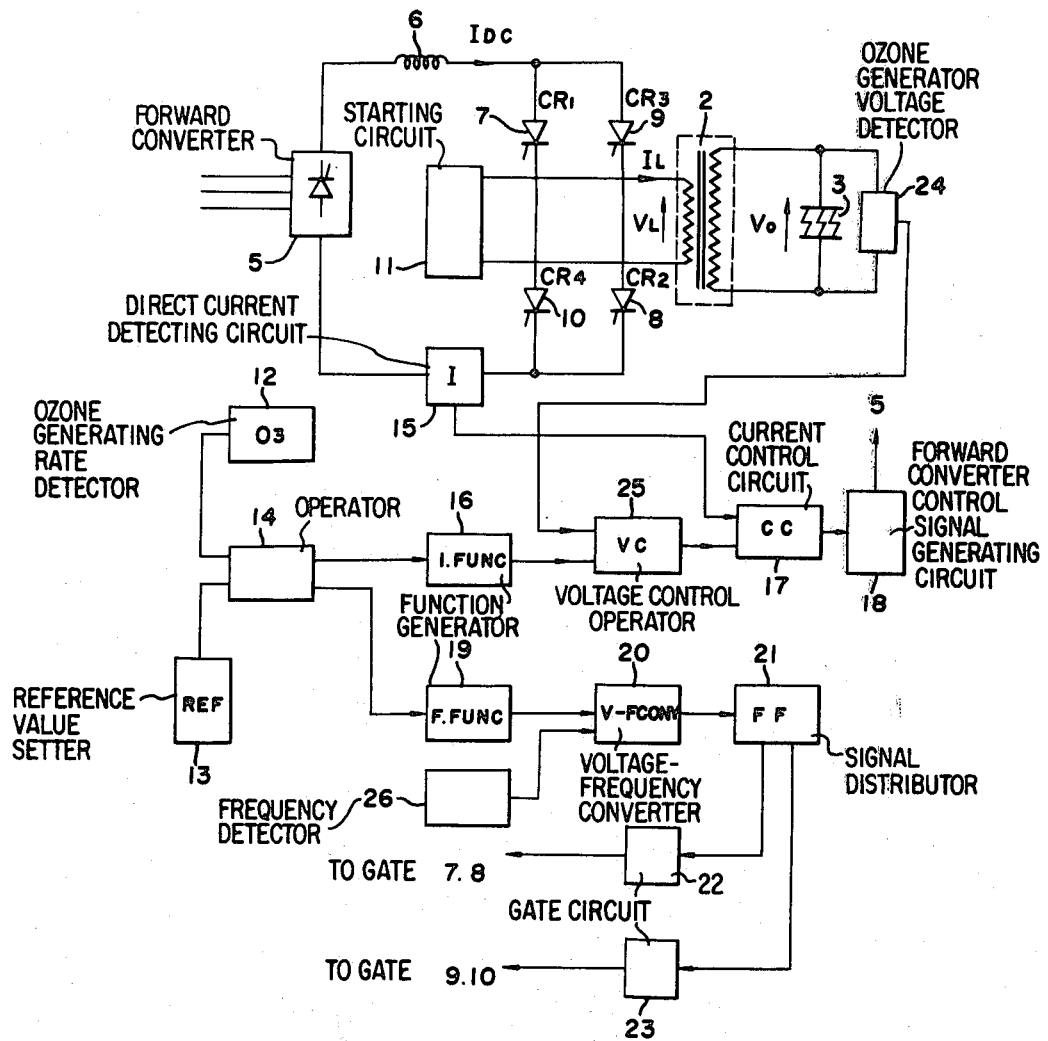

OZONE GENERATING APPARATUS

This is a continuation of application Ser. No. 577,455, filed May 14, 1975, now U.S. Pat. No. 4,051,045.

BACKGROUND OF THE INVENTION

1. Field of the Invention

The present invention relates to an ozone generating apparatus.

2. Description of the Prior Art

It is known that ozone can be generated by discharge and can be used in various fields as an oxidizing agent or as a bactericide. Recently, applications of ozone have increased, especially in the field of elimination of pollution, ozone being used for treatments of sewage, industrial drainage and nitrogen oxides $NO_x$ in effluent gas.

FIG. 1 (a) is a schematic view of a conventional ozone generating apparatus where a glass discharge tube 13 is disposed in the center of a metallic cylinder 12 and a metallic electrode 14 is adhered or vapormetallized on an inner surface of the glass discharge tube 13 and is connected to a high voltage terminal 15.

A power source 1 is connected to the high voltage terminal 15 and the metallic cylinder 12 on its outer surface so as to apply a sinusoidal waveform voltage having a commercial or high frequency. Oxygen in the air fed from one end of the metallic cylinder 12 is converted to ozone by the discharge in the gap between the metallic cylinder 12 and the glass discharge tube 13.

FIG. 2 is a circuit diagram of the power source system of the conventional ozone generating apparatus.

FIGS. 3 (a), (b) are schematic operating waveforms of power voltage V and current $i$ of the ozone generator.

In FIG. 2, the reference 1 designates the power source for driving the ozone generator (such as a power source having commercial frequency); 2 designates a boosting transformer; 3 designates an ozone generator and 4 designates a reactor for power-factor improvement.

When the power voltage is the sinusoidal waveform voltage $V_{(t)}$ of FIG. 3 (a), the ozone generator 3 is an equivalent capacitor whereby the phase gains $\pi/2$ (rad) from the power voltage as shown in FIG. 3 (b). Accordingly, the current waveform is significantly charged during the discharge period $T_E$ and the current $i_{(t)}$ as a part of the sinusoidal waveform is fed during the non-discharge period $T_D$.

The ozone generator can be considered equivalent to the series circuit of a capacitor $C_g$ formed by the glass discharge tube 13 and a capacitor $C_a$ formed by a gap between the metallic cylinder 12 and the glass discharge tube 13 as shown in FIG. 1 (b). In FIG. 1 (b), when the discharge occurs in the gap, the capacitor $C_a$ is considered as forming a short-circuit and only capacitor $C_g$ remains in the equivalent circuit. This is schematically shown as turning on the switch S.

The operation of the conventional ozone generator will now be described. The ozone generator is considered as a series circuit of the capacitors $C_g$ and $C_a$ wherein $C_a << C_g$, in general. As shown in FIG. 1 (b), the voltage applied to the ozone generator is shown as V, the partial voltage for the capacitor $C_g$ is shown as $V_g$ and the partial voltage for the capacitor $C_a$ is shown as $V_a$.

When the sinusoidal waveform voltage V is applied to the ozone generator, as shown in FIG. 4, the terminal voltage $V_a$ of the capacitor $C_a$ reaches the positive discharge voltage $V_s$ at the time $t_1$ and the discharge in the gap occurs to provide $O(V)$ of $V_a$. Prior to the discharge, the terminal voltage $V_g$ of the capacitor $C_g$ which is formed by the glass discharge tube is not substantially changed under the relation $C_a << C_g$, as shown by the dotted line.

However, when the discharge occurs as the short-circuit of $C_a$ at the time $t_1$, all of the power voltage V is applied to $C_g$ to provide $V(t_1) = V_g(t_1)$ at the time $t_1$ and $V_g$ rises to $V(t_1)$ at the time $t_1$ as shown by the dotted line. The discharge is finished in a moment and the voltage is again applied to $C_a$.

The change of the voltage V of the ozone generator appears substantially as the change of the terminal voltage $V_a$ of $C_a$ under the relation of $C_a << C_g$ and $V_g$ is not substantially changed. Accordingly, the change of $V_a$ is substantially the same as that of V and the discharge occurs at the time $t_2$ in $V_a = V_s$. At the time $t_2$, the voltage $V_g$ becomes $V(t_2) = V_g(t_2)$ whereby $V_g$ rises as shown by the dotted line. The phenomenon is repeated until the time $t_5$.

After the time $t_5$, $V_a$ changes substantially the same as V. However, $V_a \geqq V_s$ is not realized until the time the maximum value of V is reached and $V_a$ falls similar to the change of V until the time $t_6$. During this period, $V_a$ is changed from positive through zero to negative. At the time $t_6$, $V_a = -V_s$ is equal to the negative discharge voltage. At the time $t_6$, the discharge in the negative side occurs to give $V_a = 0$.

At the time $t_5$, $V_g$ becomes $V_g = V(t_5)$ and then $V_a$ is kept at a substantially constant value. However, at the time $t_6$, when the discharge occurs for $C_a$ to give $V_a = 0$, $V_g$ suddenly falls as shown by the dotted line because $V(t_6) = V_g$. After the time $t_6$, the same condition is repeated to give $V_a = -V_s$ at the times $t_7$, $t_8$, $t_9$ and $t_{10}$ and the discharges for $C_a$ occur at these times to change $V_g$ as shown by the dotted line.

Accordingly, when the ozone generator is used by applying a sinusoidal waveform voltage, the following conditions are realized.

(1) In one cycle period of the voltage $T_o$, the discharge phenomenon maintaining period is $2T_E$ from $t_1$ to $t_5$ and from $t_6$ to $t_{10}$ as shown in FIG. 4 and the discharge ceasing period is $2T_D$ from $t_5$ to $t_6$ and from $t_{10}$ to $t_{11}$. Thus, the discharge phenomenon maintaining period is only about 50% of one cycle period.

(2) The voltage $V_a$ is changed under substantially the same condition as that of V because of a constant of $\pm V_s$ of the discharge voltage in the gap and the fact that $C_g >> C_a$. Accordingly, the discharge interval is short around the zero point of the voltage V wherein $dv/dt$ is high and the discharge interval increases and is longest around the maximum value of the voltage V wherein $dv/dt$ is low.

Thus, $t_s < t_l$ in FIG. 4.

The ozone generator operates, as stated above, in one cycle period of the voltage applied by the power source whereby ozone is generated. The ozone generating rate is substantially proportional to the power fed by the power source when the conditions of the ozone generator are constant.

The power fed from the power source to the ozone generator, that is the discharge power W caused by the discharge of the glass discharge tube, is given by the equation $$W = \frac{\omega}{\pi} \int_{t_1}^{t_2} I_{dm} \cdot E_p \cdot \sin\omega t \, dt$$

wherein $\omega = 2\pi f$, when the average discharge current $I_{dm}$ is fed and the sinusoidal waveform voltage having the frequency $f[H_z]$ is applied from the power source.

The average discharge current $I_{dm}$ is given by the equation $$I_{dm} \approx \frac{C_g}{C_a + C_g} \cdot C_g \cdot S \cdot E_p \cos\omega t$$

where the discharge area of the ozone generator is S [cm$^2$].

Accordingly, the discharge power W is given by the equation $$W = \frac{\omega}{\pi} \int_{t_1}^{t_2} \frac{\omega C_g^2 \cdot S \cdot E_p^2}{C_a + C_g} \sin\omega t \cos\omega t \, dt$$
$$\approx f C_g \cdot S E_b (2E_p - E_b)$$
$$W \alpha f \cdot (2E_p - E_b)$$

wherein $E_b$ is a constant determined by a characteristic of the ozone generator 3 and $C_g$ and $C_a$ are equivalent capacitors of the ozone generator shown in FIG. 1 (b).

As stated above, the discharge power of the ozone generator which is a main factor of the ozone generating rate is proportional to the frequency and voltage of the power source for driving the ozone generator. Accordingly, in the conventional ozone generating apparatus operated by a commercial frequency power source, the output voltage of the power source is changed by switching taps of a secondary side of a transformer or a voltage controlling device (not shown) for controlling the ozone generating rate.

However, the conventional ozone generating apparatus has the following disadvantages.

(1) The voltage applied to the ozone generator must have a waveform which changes dependent upon the time to cause the discharge. When the voltage waveform is a sinusoidal waveform as is conventional, the discharge period is 2T$_E$ during one cycle period and the non-discharge period is 2T$_D$ as shown in FIG. 3 and FIG. 4. On the other hand, the power fed to the ozone generator is usually proportional to the maximum value of the voltage applied thereto.

(2) However, when the power P$_o$ is fed during the period 2T$_E$ which is realized by substracting 2T$_D$ from T$_o$ as shown in FIG. 3 and FIG. 4, the discharge power P$_o$ is generated during the short period whereby heat in a concentrated condition is generated during the short period. Accordingly, the yield of ozone is decreased because of the rising temperature of the molecules in the gap and the discharge tube may be damaged because of the thermal and mechanical stress of the glass discharge tube for the ozone generator. Accordingly, in order to prevent these difficulties, the rated power of the discharge tube should be decreased in the case of operation by application of a sinusoidal waveform voltage.

(3) Moreover, in the case of operation by application of a sinusoidal waveform voltage, $dV/dt$ of $V(t)$ is changed during operation and the discharge voltage $V_s$ in the gap is constant. Accordingly, the frequency for repeating the discharge in the initial discharge period near the time $t_1$ and $t_6$ is high and the frequency gradually decreases. The power is concentrated near the zero point of the power voltage thereby decreasing the yield of ozone and increasing the thermal and mechanical stress for the glass discharge tube as above-mentioned.

(4) The ozone generator is an equivalent capacitor load to give a low power factor. Accordingly, it is necessary to connect a reactor for power factor compensation as shown in FIG. 2 which requires a capacity for the reactive power KV$_A$ of the ozone generator.

(5) In conventional ozone generating apparatus operated by a commercial frequency power source, the voltage applied to the ozone generator is changed by switching taps of the secondary side of a transformer or a voltage controlling device in order to control the ozone generating rate. Accordingly, in the case of switching the taps of the secondary side of the transformer, the ozone generating rate cannot be finely controlled. In the case of the voltage controlling device, a large size auxiliary device such as an induction voltage controlling device is required depending upon the increase of capacity of the ozone generating apparatus.

(6) In the case of a commercial frequency power source, the frequency is fixed. The discharge current per unit area is not changed under the application of a constant voltage. In order to increase the discharge current per unit area, the voltage should be increased. Accordingly, a large size apparatus including suitable insulation of the transformer is required.

SUMMARY OF THE INVENTION

It is an object of the present invention to provide a novel ozone generating apparatus which overcomes the above-mentioned disadvantages of conventional ozone generating apparatus by feeding a rectangular waveform alternating current to an ozone generator so as to apply an ideal waveform voltage to the ozone generator and by operating the power source under a control method having a constant voltage-variable frequency control and/or a constant frequency-variable voltage control.

The foregoing and other objects are attained in accordance with one aspect of the present invention through the provision of an ozone generating apparatus comprising a rectangular waveform alternating current feed type inverter used as a power source for operating the ozone generator wherein the inverter is operated by a control method comprising constant voltage-variable frequency control and constant frequency-variable voltage control to control the ozone generating rate.

In accordance with one embodiment of the ozone generating apparatus of the present invention, the ozone generating apparatus comprises an ozone generator having a discharge tube with discharge electrodes; a power source for feeding a rectangular waveform alternating current between the discharge electrodes of the ozone generator; a forward converter; a reverse converter for converting the direct current of the forward converter to alternating current; an ozone generating rate detector for detecting the ozone generating rate of the ozone generator to generate a signal proportional to the ozone generating rate; an adder for comparing the output of the detector with a reference value; first and second function generators to receive the output of the adder with each output having predetermined characteristics; a direct current detecting circuit for detecting DC output current fed from the forward converter to the reverse converter; a forward converter control circuit for controlling the output current of the forward converter depending upon a comparison of the output of the first function generator with the output of the direct current detecting circuit; and a reverse converter control circuit for controlling the output frequency of the reverse converter depending upon the output of the second function generator.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 9 is a circuit diagram of another embodiment of the invention.

DETAILED DESCRIPTION OF THE PREFERRED EMBODIMENTS

Figure 1:
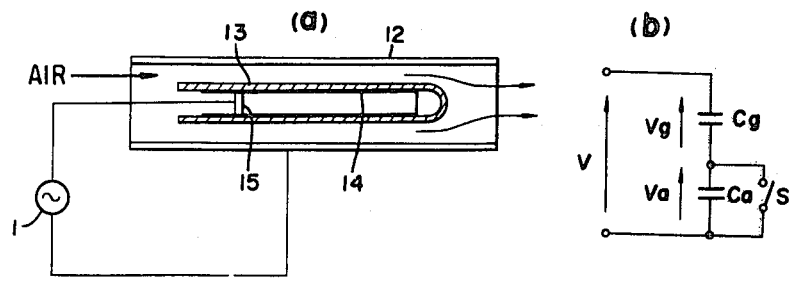
FIG. 1 shows a schematic view and an equivalent circuit of an ozone generator.

Referring now to the drawings, wherein like reference numerals designate identical or corresponding parts throughout the several views, the embodiments of the invention will be described.

Figure 5:
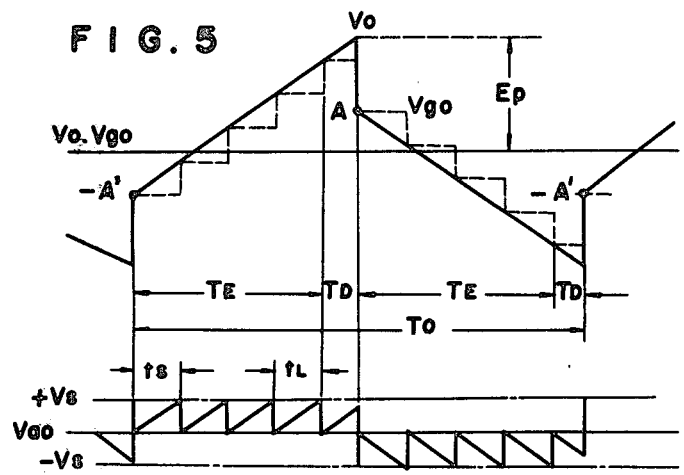
FIG. 5 shows ideal waveforms for the operation of an ozone generator.

The waveform of $V_o$ of FIG. 5 is an ideal drive voltage waveform for operation of an ozone generator. The voltage $V_o(t)$ rises in the positive side in a constant gradient and suddenly falls when the voltage reaches the maximum value $E_p$. Then it rises in the negative side in a constant gradient. When such voltage is applied, the discharge occurs during almost all of one cycle of the period $T_o$.

When the voltage $V_o(t)$ is applied to the ozone generator, the voltages applied to $C_g$ and $C_a$ are changed to $V_{go}$ and $V_{ao}$ as shown in FIG. 5. Moreover, the interval from the discharge to the next discharge for $C_a$ is the same as $t_s = t_l$ because of the constant $dV_o/dt$.

Figure 6:
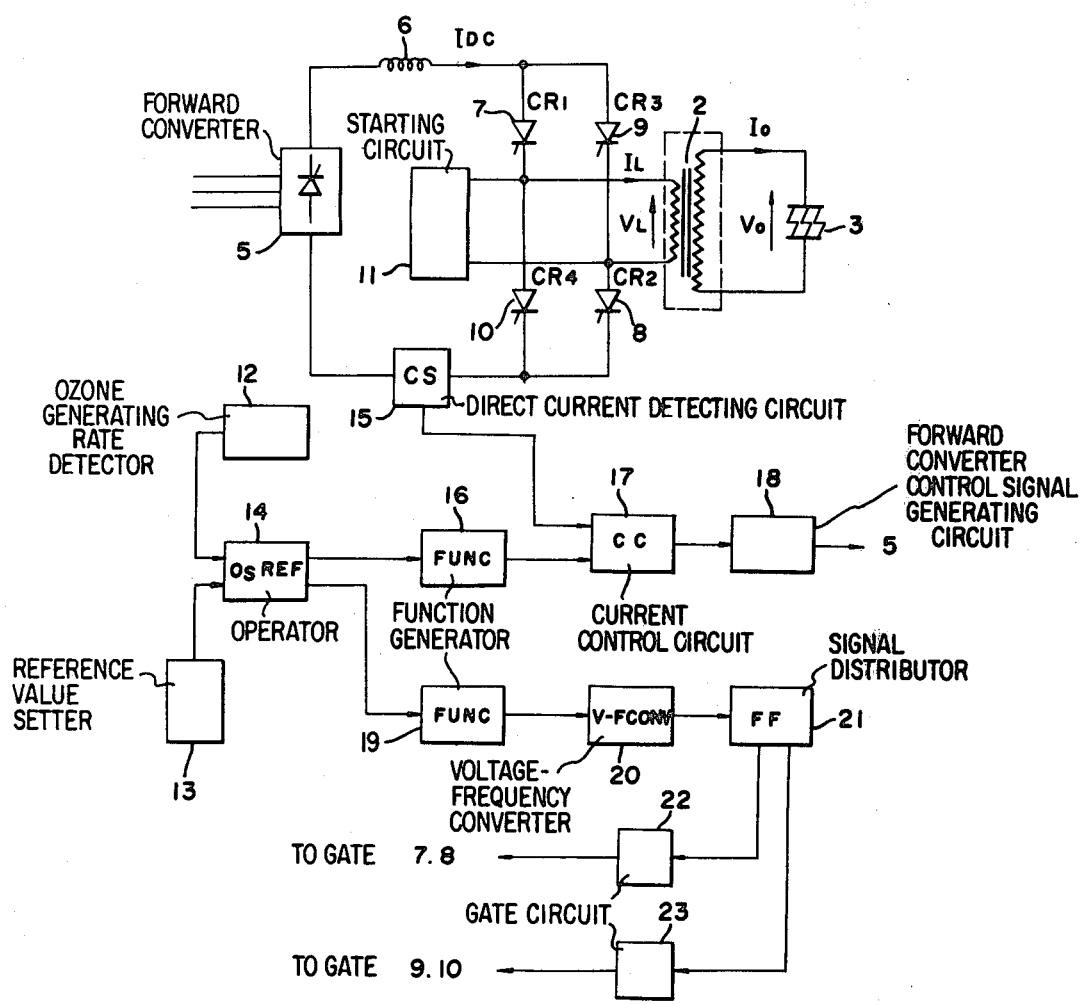
FIG. 6 is a circuit diagram of one embodiment of an ozone generating apparatus in accordance with the invention.

FIG. 6 is a circuit diagram of one embodiment of the apparatus of the invention for providing an ideal voltage waveform. In FIG. 6, the reference 5 designates a forward converter for converting the commercial frequency AC power source to a DC power source; 6 designates a DC reactor which is also used for current smoothing and for separating the DC circuit from the AC circuit; 7-10 designate a thyristor bridge which forms a reverse converter. The combination of 5-10 is usually referred to as a rectangular waveform alternating current feed type inverter.

The reference 11 designates a starting circuit for the current feed type inverter which includes control means for starting. The reference 12 designates an ozone generating rate detector for detecting the ozone generating rate and for generating a signal proportional to the ozone generating rate 13 designates a reference value setter for determining the ozone generating rate; 14 designates an operator or adder. The reference voltage circuit for determining the ozone generating rate is formed by 12-14.

The reference 15 designates a direct current detecting circuit for detecting the current fed from the forward converter to the reverse converter; 16 designates a function generator; 17 designates a current control circuit; 18 designates a forward converter control signal generating circuit. The voltage control circuit is formed by 15-18.

The reference 19 designates a function generator; 20 designates a voltage-frequency converter; 21 designates a signal distributor such as a flip-flop; 22 and 23 designate gate circuits of thyristors for a reverse converter. The frequency control circuit is formed by 19-23.

Figure 2:
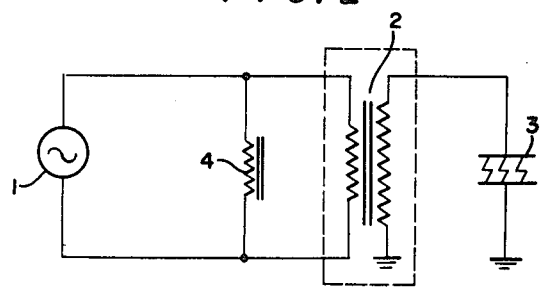
FIG. 2 is a circuit diagram of a conventional ozone generating apparatus.
Figure 3:
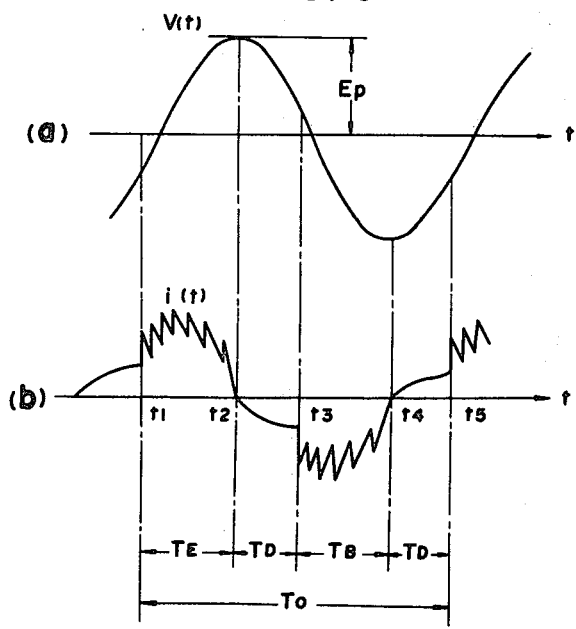
FIG. 3 shows waveforms for illustrating the operation of the apparatus of FIG. 2.
Figure 4:
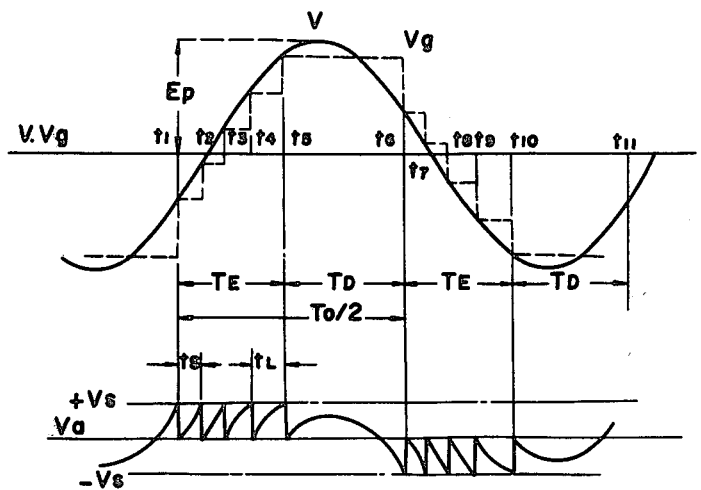
FIG. 4 shows waveforms for illustrating a discharge in the case of a sinusoidal waveform application.

The reference 2 designates a boosting transformer and 3 designates an ozone generator which are the same as those of FIG. 2.

The operation of the apparatus will now be described.

Figure 7:
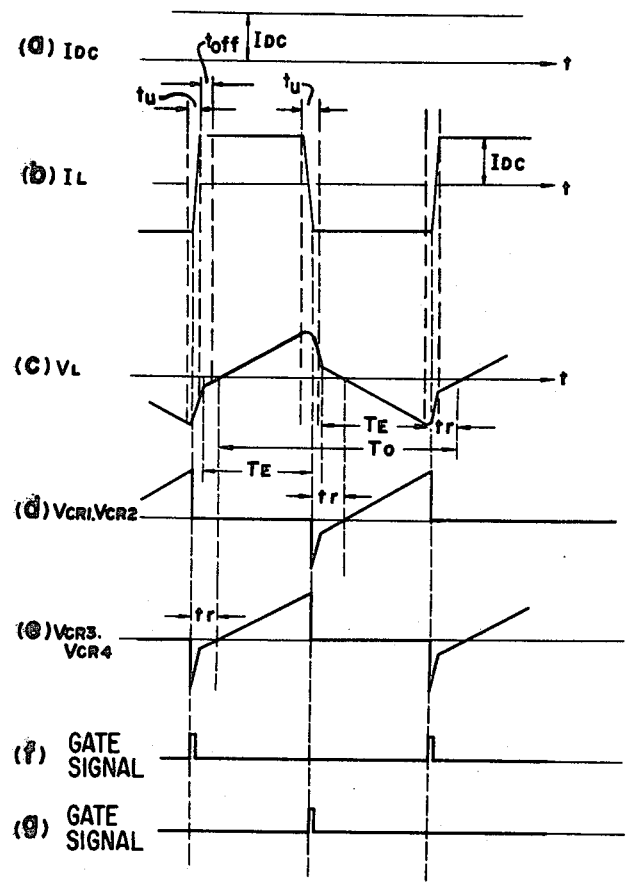
FIG. 7 shows waveforms for illustrating the operation of the ozone generating apparatus in accordance with the invention.

In FIG. 6, the DC reactor connected between the forward converter 5 and the reverse converter comprising the thyristors 7-10 usually has a high inductance in the current path. Accordingly, the current $I_{DC}$ passing through the DC reactor 6 is a constant direct current as shown in FIG. 7(a).

The reverse converter comprising the thyristor bridge 7-10 feeds the direct current $I_{DC}$ under the alternate switching of the direction of the current to the transformer 2 and the ozone generator 3. Thus, the substantial rectangular waveform alternating current which is equal to $I_{DC}$ as shown in FIG. 7(b) is fed through the transformer 2 to the ozone generator 3.

The reverse converter comprising the thyristor bridge 7-10 feeds the rectangular waveform alternating current through the transformer 2 to the ozone generator 3 in the following normal mode of operation.

When the thyristors 7, 8 are turned on, the direct current $I_{DC}$ is fed through the transformer 2 to the ozone generator 3 in one direction. After a certain period, the thyristors 9, 10 are turned on whereby the thyristors 7, 8 in the ON state are turned off by the commutation. Accordingly, the direct current $I_{DC}$ is fed through the transformer 2 to the ozone generator 3 in the opposite direction whereby the voltage $V_L$ of FIG. 7(c) is generated in the primary side of the transformer 2. The transformer 2 provides only a boosting voltage. Accordingly, the primary voltage waveform $V_L$ of the transformer can be considered to be the voltage waveform of the ozone generator 3. The voltage $V_L$ is applied to the thyristors 7,8 as a reverse voltage for the period $t_r$ by turning off the thyristors 7,8 whereby the thyristors 7,8 are completely in the OFF state. On the other hand, the thyristors 9,10 are turned off by turning on the thyristors 7,8, and the voltage $V_L$ is applied to the thyristors 9,10 as a reverse voltage for the period $t_r$ whereby the thyristors 9,10 are completely in the OFF state. FIGS. 7(d), (e) show the voltage waveforms of the thyristors 7-10 for the above-mentioned phenomenon in detail. When the waveforms of FIGS. 7(d), (e) are on the zero line, the thyristor is in the ON state. Otherwise the thyristor is in the OFF state. The rectangular waveform alternating current is fed to the transformer 2 and the ozone generator 3 by alternately repeating the turn-on and turn-off of a pair of the thyristors 7, 8 and a pair of the thyristors 9, 10 in a constant cycle period.

A constant current is fed to the ozone generator 3 which is an equivalent capacitor C for a half cycle period. Accordingly, the voltage $V_L(t)$ generated in the primary side of the transformer 2 is given by the equation $$V_L(t) = \frac{1}{C} \int_0^{\frac{T_0}{2}} I_{DC} dt = \frac{1}{C} I_{DC} \times \frac{T_0}{2} + V_L(0)$$
$$= \frac{1}{C} I_{DC} \cdot \frac{1}{2f} + V_L(o)$$

wherein $V_L(0)$ designates initial voltage. The voltage $V_L(t)$ is changed in proportion to the period.

The voltage $V_o$ applied to the ozone generator 3 has a waveform which is similar to the waveform of the primary voltage of the transformer 3 and is quite similar to the ideal voltage waveform of FIG. 5. From the viewpoint of the characteristics of the ozone generator, it can be considered an ideal waveform and it is the optimum for the ozone generator.

As stated above, the direct current $I_{DC}$ passing through the DC reactor is alternatively changed in the direction to the transformer 2 and the ozone generator 3 by switching a control rectifying element such as a thyristor. A commutating period $t_u$ is required for switching the direction of the current. During the period $t_u$, the current $I_L$ is changed from $+I_{DC}$ to $-I_{DC}$ or from $-I_{DC}$ to $+I_{DC}$. Accordingly, the current waveform is not a complete rectangular waveform but rather is a trapezoid waveform.

However, the commutating period $t_u$ is usually quite short compared with the cycle period $T_o$ for the current $I_L$. Accordingly, the current waveform is substantially a rectangular waveform. However, when the polarity of the current fed to the ozone generator is changed, the voltage $V_L$ of the ozone generator decreases to stop the discharge to form the series circuit of $C_a$ and $C_g$.

During the discharge period, the circuit is only $C_g$ because of the short-circuit of $C_a$. However, during the non-discharge period, the gradient of the voltage drop becomes high until the time of the next discharge in opposite polarity because the capacitor $C_a$ having only small capacity is charged to the opposite polarity by the same current since $C_a < C_g$. It is quite important that the voltage $V_L$ be maintained without changing the polarity just after the commutating period $t_u$.

After changing the direction of the direct current $I_{DC}$, the voltage $V_L$ is changed from one polarity through zero to the opposite polarity. The period $t_r$ from the finish of commutation to the time $V_L = 0$ is usually the period for applying the reverse voltage which is required for switching the reverse converter of the thyristor switch element 7–10 from the ON state to the OFF state.

When the period for applying the reverse voltage is shorter than the forward voltage block recovery period $t_{off}$, the switching elements in the OFF state are switched to the ON state at the moment the voltage $V_L$ is switched to the opposite polarity through the zero point whereby the DC power source forms a short-circuit to cause the commutation failure phenomenon stopping the operation of the apparatus. However, the forward voltage block recovery period $t_{off}$ of the switching element is usually in the range of 10 μs–100 μs and is quite short compared to the cycle period $T_o$.

When the current type inverter is used as a power source for the ozone generator, the phase of the current gains which respect to the phase of the voltage to cause $t_r > t_{off}$. In the current feed type inverter, the phase of the current usually gains $\varphi = 2\pi f(t_r + t_u/2)$ with respect to the phase of voltage.

Accordingly, if the voltage waveform of FIG. 7(c) is a sinusoidal waveform or a rectangular waveform having the same phase, the power factor P.F. is cos $\varphi$. However, in the case of the waveform $V_L$ of FIG. 7(c), the phase of the fundamental wave component $V_L$ decreases slightly to provide a power factor of slightly less than cos $\varphi$. When the current feed type inverter is used, it is necessary to use a reactor for power factor compensation since it is operated at the phase angle $\varphi$ for providing the reverse voltage period $t_r$ which is higher than the forward voltage block recovery period $t_{off}$ which is required for the switching elements such as thyristors 7–10 used in the reverse converter.

As stated above, the ozone generation can be effectively attained by feeding a rectangular waveform alternating current to the ozone generator. However, it is desirable to have control means for freely controlling the ozone generating rate.

The elements 12–23 in FIG. 6 are provided for controlling an ozone generating rate proportional to the discharge power by controlling the discharge power of the ozone generator which is the output power of the current feed type inverter.

The operation of the elements 12–23 in FIG. 6 will now be described.

In FIG. 6, a signal voltage proportional to the ozone generating rate is provided by an ozone generating rate detector 12 and is input to an operator 14 wherein the signal voltage is compared with the reference voltage of reference value setter 13 for determining the ozone generating rate for various purposes whereby the input signal to a voltage control circuit and a frequency control circuit is generated from the operator or adder 14 to provide a detected value of the ozone generating rate equal to the reference value.

The ozone generating rate is proportional to the discharge power of the ozone generator. The relationship $W \alpha f(2E_p - E_b)$ exists between the discharge power W, the power source voltage $E_p$ and the frequency $f$.

In FIG. 6, function generators 16, 19 provide references of current amplitude and frequency for controlling the ozone generating rate by changing the current amplitude and frequency of the current feed type inverter as the power source for the ozone generator depending upon the signal generated from the operator 14. Thus, the function generator receiving the signal of the operator 14 generates an output $I_{DC}$ proportional to the reference value is the range of the reference voltage of O $V_{r2}$ and generates a constant output for a higher reference voltage as shown by the full line of FIG. 8. The function generator 19 generates a constant output f in a range of the reference voltage of O-$V_{r1}$, generates an output proportional to the reference voltage in a range of $V_{r1}$-$V_{r2}$ and generates a constant output for a reference voltage higher than $V_{r2}$ as shown by the broken line of FIG. 8.

The output generated by the function generator 16 is input to the current control circuit 17. On the other hand, the output of the direct current detecting circuit 15 for detecting the direct current fed from the forward converter 5 to the reverse converter is also fed to the current control circuit 17 wherein the latter is compared with the former.

The current control circuit 17 feeds the control signal through the forward converter control signal generating circuit 18 to the forward converter 5 so as to always provide equal direct current which is detected by the direct current detecting circuit 15. Accordingly, the direct current $I_{DC}$ fed from the forward converter is controlled in a manner similar to the output of the function generator 16 as shown by the full line of FIG. 8.

Figure 8:
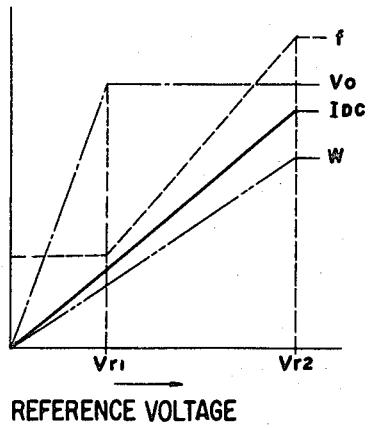
FIG. 8 shows a graph for illustrating the control operation of the apparatus of FIG. 8.

The output generated by the function generator 19 is converted to a frequency which is changed in a manner similar to the broken line of FIG. 8 by the voltage-frequency converter 20. The frequency given by the voltage-frequency converter 20 is input to the signal distributor comprising the flip-flop 21. Two signals having ½ of the output frequency of the voltage-frequency converter 20 and having a 180° phase difference with respect to each other are generated from the flip-flop 21 and are fed to the gate circuits 22, 23 of the thyristors of the reverse converter.

The gate circuit 22 of the thyristor generates the signal of FIG. 7(f) and the gate circuit 23 of the thyristor generates the signal of FIG. 7(g) whereby the pair of the thyristors 7, 8 and the pair of thyristors 9, 10 are alternatively turned on and off as stated above. Thus, the direct current $I_{DC}$ and the frequency f are controlled with respect to each reference value as shown by the full line and the broken line of FIG. 8 whereby the voltage applied to the ozone generator is changed as shown by the one dot chain line of FIG. 8.

Thus, the voltage of the ozone generator is given by the equation:

$$V_o = \frac{1}{2C} \cdot I_o \cdot \frac{1}{f} + V_o$$

wherein $I_o$ designates the current of the ozone generator and $I_o \alpha I_{DC}$.

Accordingly, the voltage $V_o$ of the ozone generator is controlled to be proportional to the direct current $I_{DC}$ under a constant frequency. When the voltage $V_o$ is constant and the frequency is increased, the direct current $I_{DC}$ is also increased to maintain the constant voltage $V_o$.

In order to protect the ozone generator from an overvoltage, the frequency f and the direct current $I_{DC}$ should have a maximum limit when the signal of the operator or adder 14 is higher than the reference voltage $V_{r2}$ as shown by the full line and the broken line of FIG. 8. Accordingly, the ozone generating rate corresponding to $V_{r2}$ is the maximum ozone generating rate.

In FIG. 8, the points $V_{r1}$ and $V_{r2}$ of the curve or the gradient of the curve are determined depending upon the characteristics of the ozone generator 3 and the required control range of the ozone generating rate.

In accordance with the control circuit having the above-mentioned characteristics, the ozone generating rate is controlled by the voltage of the ozone generator under a constant frequency in a range constituting a relatively low ozone generating rate. On the other hand, the ozone generating rate is controlled by the frequency under a constant voltage of the ozone generator in a range constituting a relatively high ozone generating rate. Thus, the ozone generating rate can be controlled in a broad range without the necessity for insulation of the ozone generating apparatus. In the control range of the ozone generating rate, the control of the frequency and the voltage of the ozone generator can be easily performed whereby the control of the ozone generating rate is relatively easy and can be quite accurate.

The two dots chain line of FIG. 8 shows that the discharge power W which is proportional to the ozone generating rate can be controlled linearly, accurately, broadly and easily by the combination of the constant frequency-variable voltage control and the constant voltage-variable frequency control under the relation of the discharge power W $\alpha f \cdot (2E_p - E_b)$.

FIG. 9 is a circuit diagram of another embodiment of the invention. In FIG. 9, the elements 2, 3, 5–23 are the same as those of FIG. 6 and the effects thereof are also the same. The reference 24 designates an ozone generator voltage detector; 25 designates an operator for voltage control; 26 designates a frequency detector.

The voltage which is proportional to the voltage of the ozone generator is input to the voltage control operator 25 by the ozone generator voltage detector 24 and is compared with the output of the function generating circuit 16. The operator 25 generates an output to control the voltage of the ozone generator at the predetermined value given by the function generating circuit 16 to actuate the current control circuit 17. Accordingly, the voltage of the ozone generator is always controlled at the predetermined value whereby stable operation of the ozone generating apparatus is obtained which is effective for protecting the ozone generator.

The frequency detector 26 detects the frequency of the current feed type inverter for driving the ozone generator. The signal is input to the voltage-frequency converter 20 wherein it is compared with the output of the function generator 19. The signal is output from the voltage-frequency converter 20 to the distributor 21 such as a flip-flop so as to always realize the predetermined frequency. Accordingly, the frequency is always controlled at the predetermined value and stable operation of the ozone generator is obtained.

As stated above, in accordance with the invention, the ozone generating apparatus has the following excellent effects:

(1) The ozone generating rate can be easily controlled in a broad range since the discharge power which corresponds to the ozone generating rate is controlled by the constant frequency-variable voltage control or the constant voltage-variable frequency control or a combination thereof.

(2) The voltage applied to the ozone generator can be desirably low since the constant voltage-variable frequency control is realized in a high ozone generating rate range. Accordingly, insulation can be minimized and the apparatus can be miniaturized.

(3) The discharge power can be linearly controlled by controlling the voltage and frequency of the ozone generator in proportion to the direct current of the current feed type inverter. Accordingly, the ozone generating rate can be controlled with high accuracy.

(4) A voltage similar to the ideal waveform of FIG. 5 is applied to the ozone generator by using the current feed type inverter. Accordingly, the discharges occur in equal intervals during the cycle period, the power fed to the ozone generator is uniform, the yield of ozone is high and the thermal and mechanical stress of the discharge tube are significantly decreased. (5) Accordingly, the rated power for a discharge tube having the same size can be significantly increased compared with operation by a conventional sinusoidal waveform voltage.

(6) The apparatus including the discharge tube can be significantly miniaturized because of the increase of the rated power.

(7) Ozone generating apparatus of large capacity can be provided.

(8) It is unnecessary to use the reactor for power compensation and the voltage adjuster required in conventional apparatus.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. An ozone generating apparatus comprising:
   an ozone generator having a discharge tube with discharge electrodes,
   a rectangular waveform current feeding device for feeding rectangular waveform alternating current through the discharge electrodes of the discharge tube without a capacitive coupling circuit between the discharge electrodes and the rectangular waveform current feeding device for driving the ozone generator, and
   control means for controlling the ozone generating rate of the ozone generator by controlling the current and/or the frequency of the rectangular waveform alternating current.

* * * * *